United States Patent [19]

Tresser

[11] 4,394,392

[45] Jul. 19, 1983

[54] PROCESSES FOR PRODUCING COMPOSITE ICE CONFECTIONS, AND PRODUCTS THEREOF

[75] Inventor: David Tresser, Bedford, England

[73] Assignee: Thomas J. Lipton, Inc., Englewood Cliffs, N.J.

[21] Appl. No.: 244,797

[22] PCT Filed: Jul. 21, 1980

[86] PCT No.: PCT/GB80/00120

§ 371 Date: Mar. 20, 1981

§ 102(e) Date: Mar. 17, 1981

[87] PCT Pub. No.: WO81/00190

PCT Pub. Date: Feb. 5, 1981

[30] Foreign Application Priority Data

| Jul. 20, 1979 | [GB] | United Kingdom | 7925374 |
| Jul. 20, 1979 | [GB] | United Kingdom | 7925375 |
| Jul. 20, 1979 | [GB] | United Kingdom | 7925401 |
| Jul. 20, 1979 | [GB] | United Kingdom | 7925402 |
| Jul. 20, 1979 | [GB] | United Kingdom | 7925447 |

[51] Int. Cl.³ .................... A23G 9/04; A23G 9/24
[52] U.S. Cl. .................. 426/101; 426/307; 426/606; 426/607; 426/613
[58] Field of Search ........... 426/101, 307, 606, 607, 426/100, 613

[56] References Cited

U.S. PATENT DOCUMENTS

| 2,925,347 | 2/1960 | Cummings et al. | 426/307 |
| 3,099,564 | 7/1963 | Gooding | 426/607 |
| 3,307,953 | 3/1967 | Siebers | 426/607 |
| 3,333,968 | 8/1967 | Bell et al. | 426/101 |
| 4,086,370 | 4/1978 | Olds et al. | 426/101 |

FOREIGN PATENT DOCUMENTS

| 947672 | 1/1964 | United Kingdom . |
| 978086 | 12/1964 | United Kingdom . |
| 1017480 | 1/1966 | United Kingdom . |
| 1102944 | 2/1968 | United Kingdom . |
| 1316079 | 5/1973 | United Kingdom . |
| 1488305 | 10/1977 | United Kingdom . |

*Primary Examiner*—Jeanette M. Hunter
*Attorney, Agent, or Firm*—Brumbaugh, Graves, Donohue & Raymond

[57] ABSTRACT

Composite confection of a biscuit or wafer with a frozen confection the biscuit or wafer having a converture of a sweetened fat-containing composition having a slip M.P in the range of 27°–34° C. and a viscosity at 46° C. of $N_3$ at 10 poise, $N_{100}$ at least 2.0 poise, and $N_{CA}$ at least 1.2 poise.

14 Claims, No Drawings

PROCESSES FOR PRODUCING COMPOSITE ICE CONFECTIONS, AND PRODUCTS THEREOF

This invention relates to composite edible products and to processes and apparatus for their preparation. The invention has for example particular application to composite frozen edible products, particularly ice confections.

It is known to produce composite edible products in which a dry edible material is separated from direct contact with a water-containing edible material by a relatively water impermeable edible layer. One commercially-produced composite ice confection comprises a mass of edible ice or ice-cream within a container of edible biscuit or wafer. In this confection the ice or ice-cream contacts a thin layer of chocolate or other edible fatty material coated on to the edible biscuit or wafer container. One purpose of the fatty layer is to prevent uptake of water into the biscuit or wafer material from the ice or ice-cream, since such water uptake gives the biscuit or wafer material a soggy consistency which is unacceptable to the consumer. Nevertheless, our experience of several methods of producing such composite confections at present in use shows that sealing of the biscuit or wafer material against water entry is always more or less imperfect. In this way we can explain the result that the products have only a somewhat short shelf-life before becoming spoiled.

Hence, it is desirable to produce such composite products by methods and in arrangements which give acceptably low rates of water entry from the water-containing edible materials into the dry edible materials once the composite products have been made, so as to obtain products of acceptably long storage- or shelf-life.

In one aspect, the present invention provides a process for producing a composite edible product in which a dry edible material is separated from direct contact with a water-containing edible material by a solid fusible and relatively water-impermeable edible layer, the process comprising applying the relatively water-impermeable material in the fused state to the dry material and thereafter applying the water-containing edible material to the composite so formed, the layer of relatively water-impermeable fat-containing material being applied in the fused state to the dry material, e.g. baked wafer container, by means of an atomising spray gun, and having (when measured at 46° C.) the following viscosities: $\eta_3$ at least 10 poise, $\eta_{100}$ at least 2.0 poise, preferably 2.0–3.6 poise, and $\eta_{CA}$ at least 1.2 poise, preferably 1.4–3.4 poise.

Embodiments of this process have been found capable of providing composite products in which the relatively water-impermeable layer is of a quality to provide acceptably long shelf-lives.

Good results have been achieved in carrying out certain embodiments of the process when the fused water-impermeable material is sprayed in the form of droplets on to the dry material so that the droplets coalesce before solidification to form a layer, which can for example be as little as 0.2–0.8 mm in thickness, e.g. 0.5 mm thick.

One suitable atomising gun for example is one which delivers an atomising spray substantially uniformly over the area of dry edible material to which the relatively water-impermeable layer is to be applied, for example, a commercially available (de Vilbiss) (Trade Mark) gun, which atomises the material to be sprayed with compressed air.

Where for example an open-topped wafer cone is to receive an internal layer, the gun can advantageously be one which delivers an atomised spray within the volume of an inverted cone downwardly into the mouth of the wafer cone to be coated.

In another embodiment, good results have been achieved by cooling the sprayed-on fatty layer by an applied cooling fluid stream at least to initiate its solidification before application of the water-containing edible material, e.g. ice confection.

The applied cooling fluid stream is advantageously a stream of cold air or of liquid nitrogen, and good results can be achieved when the cooling fluid stream is applied to the layer of relatively water-impermeable material for 0.1–5 seconds, e.g. 1 second.

The relatively water-impermeable material can suitably be a chocolate mix, or a chocolate-flavoured or otherwise flavoured fatty mix capable of resisting the passage of water to an acceptable degree when it is solid.

The material can be characterised by a viscosity at 43° C. and 100 $s^{-1}$ of about 180–240 centipoise. Its slip melting point is desirable above 24° C., e.g. in the range 25°–45° C., suitably about 27°–33° C.

A particular preferred application of the invention is to the preparation of composite ice confections. In such applications an ice cream or other ice confection is dosed into an edible wafer or biscuit container, e.g. of conical form, after this container has been covered internally in accordance with the above description with a relatively water-impermeable layer, e.g. a confectionery-flavoured edible fatty mixture; the layer is then cooled with a liquid nitrogen stream, and a portion of ice confection is dosed into the container, e.g. in semi-solid form, after which the whole is further frozen.

Advantageously the wafer or biscuit container is itself located within a closely-fitting outer wrapping, e.g. of paper or foil, before its use for preparing the composite confection. Then it is desirable to provide for the layer of the relatively water-impermeable material to seal the uppermost edge of the wafer or biscuit to the outer wrapping to minimise moisture flow around this edge.

It has been found that composite ice confections so produced can have excellent shelf-life and resistance to moisture movement from the ice to the container of wafer or biscuit.

It can be seen that the invention also provides a machine for carrying out the process of the invention, comprising: means for receiving a unit of dry edible material and for transferring the unit to a layer-applying station; means for applying a layer of relatively water-impermeable material in the fused state to a unit of dry material at the layer-applying station; means for applying a cooling fluid stream to such a unit after application of the layer thereto; and means for dosing a water-containing material to the unit with a layer of relatively water-impermeable material applied thereto, after application of the cooling fluid stream. Such apparatus and its use can of course desirably employ any and all of the additional features mentioned above in describing the process of the invention.

The invention also provides a composite edible product comprising a dry edible material separated from direct contact with a water-containing edible material by a relatively water-impermeable edible layer, wherein the material of the edible layer has for example a viscosity of 180-240 centipoise when measured at 43° C. and 100 s$^{-1}$, and desirable a slip melting point above 24° C., e.g. in the range 25° C.-40° C., suitably about 33° C. This composite product can, but need not, be prepared by the process and apparatus previously described above, and a preferred but non-limitative embodiment of the product is an externally-wrapped composite frozen confection comprising an edible wafer or biscuit container, e.g. of conical form, coated within by a layer of the relatively water-impermeable layer as described above, within which is located an ice cream or other ice confection. We find that with a layer of for example chocolate-flavoured fatty coating 0.3-0.8 mm thick, e.g. 0.5 mm thick, desirably sealing the edges of the container as well as providing an overall internal coating, the composite product can have a desirably long shelf-life without unacceptable migration of moisture into the biscuit or wafer material.

It will be clear that numerous variations of the invention described herein will be available to the skilled reader on the basis of this disclosure, for example it will be possible to interchange corresponding features described in respect of the several embodiments.

The invention is described for illustration by way of the following example of one preferred way of preparing a composite edible product according to the invention, by a process and apparatus also according to the invention.

EXAMPLE 1

Open-topped confectionery wafer cones contained in open-topped conical card wrappings, were passed along a conveyor of an apparatus having sequential coating, cooling and filling stations.

At the coating station, each cone had a 0.5 mm thick layer of chocolate-flavoured fatty couverture applied to its internal surfaces from a downwardly-directed atomising spray gun (from de Vilbiss Limited) arranged to deliver a conically-directed spray of the molten couverture mixture with compressed air into the open top of the cone.

The couverture consisted of 45% hardened butterfat (butterfat hardened by selective hydrogenation with a sulphur-poisoned nickel catalyst to a slip melting point of 33°-34° C.); 16.3% cocoa powder (10/12); 38.7% sugar; and flavouring (trace). It was applied at 43° C. The location and quantity of coating was such as to provide a substantially even coat and seal the top edge of the cone to the outer wrapping, which extended upwardly beyond it.

After application of the couverture, each cone was shifted to a cooling station where a jet of cold air at −12° C. to −20° C. was applied to it for 0.5 seconds. Then the cooled coated cone was shifted to a filling station where a dose of ice cream or non-dairy ice confection mix at −5° C. was dosed into the coated cone. Finally the composite confection was further frozen and hardened at −26° C. for 30-45 minutes. Its further treatment, additional decoration or further wrapping was conventional and forms no part of this invention. It was found that the product of this Example could be stored for some months without unacceptable moistening of the wafer cone by water from the ice cream or non-dairy ice.

As well as the fats described above, those described below can be applied in processes and apparatus as disclosed herein above.

Among such useful edible fat compositions are those having:
(a) solids content index (SCI) values (%) (as defined below) in each of the following ranges:
   70-93 at −20° C.;
   65-93 at −10° C.;
   55-90 at 0° C.;
   15-40 at 20° C.;
   0-12 at 30° C.;
   0 at 40° C.;
(b) slip melting point in the range 25°-45° C.;
(c) a viscosity at 40° C. corresponding to measured values (as defined below) as follows:
   $\eta_{100} \geq 35$ centipoise; (e.g. $\geq 40$ centipoise;)
   $\eta_{CA} \geq 30$ centipoise; (e.g. $\geq 33$ centipoise;) and
(d) a coating pliability parameter (as defined below) of at least 3. (In the foregoing and succeeding description reference is made to a number of parameters defined more closely by reference to test methods described hereinbelow.)

Preferably these fat compositions also have SCI values (%) in each of the following ranges:
   75-90 at −20° C.;
   75-85 at −10° C.;
   65-75 at 0° C.

Their preferred slip melting points are in the range 25° to 36° C.

We find that such fats give particularly good results in terms of preventing moisture penetration owing to their lack of excessive brittleness. We also find that they can be formulated into confectionery coating compositions of distinctly good flavour and mouthfeel on their consumption as part of a composite frozen confection. It can also be of advantage if the fat is one that gives a confectionery composition which in the test given below performs with a brittleness time of $\geq 45$ seconds, e.g. $\geq 60$ seconds.

The fats can suitably be such as to show a change in solids content over the last 5° C. of their melting profile of at least 20% of their solids content at −20° C. Their maximum rate of solids formation upon cooling is preferably above 18% per minute, with the time taken to reach 50% solids normally less than 4 minutes. The maximum solids content achieved in $\leq 20$ minutes is normally in the range 70-90%.

Normally we prefer for ice confection use those fats which yield confectionery coatings of the following viscosities at 46° C. when such coatings are formulated using 45% fat content by weight:
   $\eta_3 \geq 10$ poise;
   $\eta_{100} \geq 2.0$ poise, preferably 2.0-3.6 poise;
   $\eta_{CA} \geq 1.2$ poise, preferably 1.4-3.4 poise.

All these parameters are as defined by the test methods noted below or their equivalents.

Fat compositions for use according to the invention can for example comprise triglycerides of which a major or minor proportion by number (but less than ⅜ by number) are short-chain (C$\leq 6$) acyl groups and of which substantially the complement (more than ⅝ by number) are long-chain C$\geq 12$ acyl groups. The short and long-chain acyl groups are substantially randomly distributed amongst the triglycerides. This can be achieved (a) by mixing heterogeneous glycerides, i.e. those having both long and short acyl groups, and/or (b) by interesterifying a mixture of unlike glycerides.

Techniques for interesterification, e.g. with sodium methoxide catalyst, are known per se and require no further description herein, though particular manners of carrying out interesterification are shown below.

One very suitable fat composition comprises a mixture of a lauric fat or oil or a non-lauric fat or oil, (optionally hydrogenated either selectively or unselectively to a desired slip melting point, and preferably present at 25–75% by weight) with a short chain acylated (i.e. preferably diacetylated) long chain monoglyceride, preferably present at 75–25% by weight). The long chain acyl groups of the short chain acylated monoglyceride can be derived from any source: $C_{18}$ saturated (stearyl) groups can be used, or optionally shorter chains or unsaturated chains can be present. In particularly preferred embodiments, palm kernel oil and/or cottonseed oil, preferably at about 50% are blended with acetylated $C_{16}$ and/or $C_{18}$ monoglyceride, substantially saturated. A substantially equivalent embodiment can if desired by produced by interesterifying a mixture with corresponding acyl content differently distributed.

By selective hardening we mean exposure of the fat material to be treated to a catalyst which brings about isomerisation of the ethylenic bonds without substantial hydrogenation: consideration geometrical isomerisation (cis⟷trans) occurs. A suitable known catalyst for the purpose is a poisoned nickel catalyst (a fresh nickel catalyst gives much hydrogenation (unselective hardening) but little of the isomerisation required in selective hardening).

The fats preferred of one category of those used according to the invention are triglyceride mixtures comprising a major proportion of acyl groups derived from lauric fats or oils, or non-lauric fats or oils (optionally hydrogenated unselectively or else selectively hardened), and a minor proportion by number of acyl groups with substantially short chains lengths, e.g. up to $C_6$. Preferably all or nearly all the short chain acyl groups are present in mixed triglycerides containing both short and long chains. So, for example, when palm kernel oil is used as a component of the fat, either alone, or in blend with, or in interesterified mixture with another lauric fat or oil or a non-lauric fat or oil, the short chain acyl groups can be introduced by interesterification with for example glyceryl triacetate or glyceryl tributyrate or glyceryl trihexanoate, or they can be introduced by blending (and optional interesterification) with an acetylated long chain monoglyceride or diglyceride, or a long chain mono- or di-glyceride acylated with short chain acyl groups.

Preferably the short chain acyl groups form up to about 20% by number of the total acyl groups of the triglyceride mixture.

Where the short chain acyl groups are acetyl groups, they are preferably present at up to the equivalent of the number of acyl groups that would be provided by 5% by weight triacetin in tripalmitin or a mainly palmitic fat or oil, suitably up to 3% by weight, e.g. 2% by weight. Where the short chain acyl groups are butyryl or hexanoyl groups they are preferably present at up to the equivalent of the number of acyl groups that would be provided by 10% by weight glyceryl trihexanoate in tripalmitin or a mainly palmitic fat or oil, suitably up to 5% by weight.

Suitable examples of fats of this type, given for illustration and not limitation, are:

(a) an interesterified blend 97% palm kernel oil and 3% triacetin (by weight), which can be selectively hardened to a slip melting point in a suitable range, e.g. about 25.5° C.

(b) an interesterified blend of 90% coconut oil and 10% butterfat. (From this last example it can be seen that a natural source, i.e. in this case butterfat, can be used for the short chain acyl groups, the proportion of the respective material chosen in dependence on its content of such acyl groups.)

The use of hardened lauric oils gives fats with higher slip melting point than when untreated lauric oils are used. When hardened lauric oils are used, somewhat more short chains can be present than otherwise, since one effect of these is to lower the slip melting point.

"Lauric fat or oil" means an edible oil or fat having lauric and/or myristic acids as substantial fatty acyl constituents, (e.g. constituting 40–50% or more of the acyl groups) with the remaining fatty acyl content containing very little unsaturation: examples are palm kernel oil (preferred), babassu oil, coquito oil, coconut oil (also preferred).

The term "non-lauric fat or oil" means an edible oil in which the principal fatty acyl content is not lauric acid, and for example in which there is a substantial amount of $C_{16}$ and/or $C_{18}$ unsaturated acyl groups, e.g. oleic, linoleic and/or linolenic acyl groups: the remaining bulk of the acyl groups is largely saturated, (e.g. $C_{16}$ and/or $C_{18}$ acids). Examples of such non-lauric oils are cottonseed oil, peanut oil, soybean oil, sesame oil, safflower oil and sunflower oil, and particularly rapeseed oil (e.g. low-crucic rapeseed oil) and soyabean oil, and also palm oil.

Of course it is understood that in the interesterified blends other sources of acyl groups can be substituted for those quoted and for one another if their proportions and types of acyl groups are sufficiently similar, without regard to their identical triglyceride combination or isomeric analysis. As an example, palm oil can in such compositions be substituted often by lard.

The above-described compositions can be modified in a number of ways. For example, without limitation, the long-chain acyl groups may be derived partly or wholly from fatty compositions which have been made subject to interesterification or other processing, as well as from natural or refined fats and oils. For example, good results have been obtained when the palm kernel oil or cottonseed oil or other lauric or non-lauric fats and oils used as source of long-chain acyl groups are substituted wholly or in part by interesterified blends, e.g. interesterified blends of lauric and non-lauric fats and oils such as palm kernel oil and palm oil, for example in 40–70:60–25 weight proportions, e.g. 60:40. Such a blend can be combined by mixing with, for example, 25-50-75% (of the final fat composition) of diacylated long-chain monoglyceride, e.g. diacetyl $C_{16/18}$ monoglyceride, or by interesterification with a short-chain triglyceride, e.g. triacetin. (Clearly, a single interesterification step will suffice in the latter case.).

Particularly good results have been noted in terms of lack of brittleness where the final composition contains an appreciable portion of a eutectic formed between long-chain triglyceride and a di-(short-chain acyl) mono-(long-chain acyl) glyceride, as is the case with blends of palm kernel oil (25–75%) and diacetyl mono $C_{16/18}$ acyl glyceride (75–25%) and their equivalents.

Slip melting points of the above fat compositions can for example be in the range 24°–42° C.: these and viscosities can be chosen according to the desired method of application of the coatings derived therefrom.

The use of hardened lauric oils gives fats with higher slip melting point than when untreated lauric oils are used. When hardened lauric oils are used, somewhat more short chains can be present than otherwise, since one effect of these is to lower the slip melting point.

Another group of fat compositions suitable for use in this invention comprises an interesterified blend of a lauric fat or oil (e.g. at about 15–45%) with a non-lauric fat or oil (e.g. at about 85–55%). Interesterified blends of palm kernel oil or other lauric fat or oil (30–55%) with palm oil (70–45%) have been found particularly suitable.

Confectionery coating compositions used in this invention comprise a fatty base including one or more of the fat compositions of the types specified above, together with suspended sweetening and flavouring solids, e.g. cocoa powder and sugar; optionally with milk solids and emulsifiers and other additives. Suitably the fat can constitute e.g. 30–70% of the coating compositions, preferably about 40–60% (e.g. about 50%).

Composite frozen confections according to the invention can comprise layers or zones of such coating compositions together with layers or zones of ice confection and optionally layers or zones of baked or crispy confection, e.g. water.

The solids content index, brittleness time, viscosity and coating pliability referred to herein are measurements obtained as described below. The slip melting point is measured by standard procedures well known to those skilled in the field to which this invention relates.

In this specification the solids context index (SCI) refers to a measurement obtained by the following or an equivalent test method: a sample of fat is placed in a low-temperature measurement cell of a wide-line nmr spectrometer calibrated for measurement of sample quantity, such as the "Quantity Analyser" commercially available from Newport Instruments, Newport Pagnell, Buckinghamshire, England. The sample is held at a required temperature for 10 minutes and then the percent solid fat is obtained from the instrument indication. The result is an SCI(%) referred to the test temperature.

The rate of crystallisation of a fat composition sample can conveniently be measured under conditions when the sample (at 32° C.) is placed in an nmr cell of the same wide-line nmr spectrometer at −20° C., and monitoring the signal level from the spectrometer at frequent intervals over about 20 minutes, intercalated with frequent temperature measurements using a temperature probe inserted whenever required into the sample cell, and removed to allow nmr measurement. The maximum rate of solids formation achieved is the steepest tangent to the curve of solids content versus time obtained from these measurements, and is expressed in % solids per minute.

In this specification "the brittleness time" refers to a measurement obtained by the following or an equivalent test method in which what is estimated is the speed at which a confectionery coating composition (containing the fat to be tested) becomes brittle on being used to coat a frozen confectionery article. The fat composition to be tested is incorporated at 59.2% of a confectionery composition containing 25.7% icing sugar, 12.9% cocoa powder (of 10/12% fat content), 1.7% skim milk powder and 0.5% lecithin. The total fat content of the composition should be 60.6%. Any conventional formulation process can be used: desirably the composition is rendered to a final particle size of 17–19 μm by micrometer screw gauge, with most particles of 14–16 μm as measured by a Sheen gauge: by Coulter Counter (Trade Mark) measurement 75% of particles are desirably 22 μm. The confectionery composition prepared this way is melted at 36° C. for 20 minutes in a gently stirred jacketed vessel, and used to coat frozen ice confection (ice cream) blocks on sticks in the following way. The blocks are desirably of 30 g weight and 100% overrun, stored at −26° C., taken from the store and immersed 9 seconds in moulds surrounded by water at 30° C., so that their surface temperature rises to −5° C. and their interior temperature to −15° C.: the blocks are then immediately dipped into the molten coating composition (immersion for about ½ second), withdrawn, and small sections of the coated block repeatedly cut off with a relatively blunt implement at closely-spaced time intervals by any suitable method until the coating can be heard to give an audible crack on cutting. The purpose is to simulate the conditions under which such compositions and coatings are bitten during consumption, and a test consumer can be used if desired. The time elapsed between the coating immersion and the propensity of the coating to give an audible crack on cutting is taken as the "brittleness time" as referred to in this specification.

In this specification the viscosity measurements $\eta_3$, $\eta_{100}$ and $\eta_{CA}$ are measurements obtained by the following or equivalent test methods. Viscosity measurements can be made on fat compositions or on coating compositions made therefrom. Where a coating composition is characterised, the viscosity measurement is made on the composition itself. Where a fat composition is in question, the viscosity measurements are either made on and referred to the fat composition itself or made on and referred to a coating composition comprising 45% of 59.2% by weight of the fat. Normally, coating compositions of 45% fat are used as standard where the coating compositions are intended for use in enrobing ice confections, and compositions of 59.2% fat where they are intended for use by dipping processes.

The parameters $\eta_3$ and $\eta_{100}$ represent the apparent viscosity at the quoted temperature (e.g. 40° C.) at shear rates of respectively 3 sec$^{-1}$ and 100 sec$^{-1}$. The parameter $\eta_{CA}$ represents the Casson plastic viscosity.

The parameter $\eta_{CA}$ (Casson plastic viscosity) is determined (e.g. using a similar viscometer to that mentioned above), but according to the method of N. Casson (Rheology of Disperse Systems, Pergamon Press, London 1959).

The parameter $\eta_3$ is measured for example using a Deer Rheometer PDR81 (Trade Mark) having an inner rotating cylinder or bob lowered onto a temperature-jacketed outer stationary cylinder containing the sample composition. The inner cylinder or bob is driven at a controlled shear stress and the shear rate induced is measured: the apparent viscosity at a 3 sec$^{-1}$ shear rate is determined from the results obtained at a succession of shear stresses.

In this specification the coating pliability refers to a parameter obtained by the following or an equivalent test method. Polythene strips (2.5×6 cm) are immersed in molten, prestirred coating composition or fat under test, to coat an area 25×50 mm. The coating weight is controlled by adjustment of temperature of the molten material to give mean coating film thickness of 0.08–0.1 mm (for fats) and 0.34–0.38 mm (for confectionery coating compositions). Surplus material is drained from the strips and their coatings allowed to harden. Six strips of each coating type are carefully supported at the uncoated end in boxes so that their only point of contact with the inside of the box is at the coated end. The boxes are stored at −15° C. for 24 hours. The coatings are then assessed for pliability (at −15° C.) by exerting gentle steady manual pressure on the strips to bend the ends towards each other. The strips are then given coating pliability ranking values in accordance with their appearance: no imperfections or discontinuities in coating, 5 (very pliable); striations, 4 (pliable); tears (ragged breaks), 3 (some pliability); cracks (one or at most two clean breaks), 2 (brittle); severe cracking (fragmentation or flaking), 1 (very brittle).

The confectionery coating compositions described above containing the above-specified fat compositions can advantageously be sprayed onto ice confection or other confectionery material to be used in conjunction therewith (e.g. a wafer or baked container for ice confection) by means of an atomising spray gun, as in the Examples given herein.

EXAMPLE 2

A fat composition was prepared by blending (in conventional manner) refined palm kernel oil (50% by weight) and a commercially obtainable diacetylated long-chain saturated monoglyceride ($C_{16}$ and $C_{18}$) of slip melting point about 44° C. (50% by weight).

This fat composition according to the invention was used in accordance with the invention to make a dark chocolate-flavoured confectionery coating composition containing 50% of the fat composition; 36.5% sugar (sucrose); 13% cocoa powder (12/12% fat content); and the balance a minor amount of flavourant and emulsifier.

The resulting confectionery coating composition was used as described below for spray-coating in the manufacture of composite ice confections and gave good texture combined with excellent processing qualities, and good resistance to permeation of moisture, as described in Example 1.

Further examples of useful fat compositions are given below.

EXAMPLE 3

(i) Refined palm kernel oil and commercial food-grade triacetin were blended in the ratios of 97:3 respectively. A batch of the blend were interesterified in a vessel fitted with a powerful stirrer, $N_2$ inlet and temperature control, by heating to 110° C. under $N_2$, agitation and injection of 0.2% by weight sodium catalyst. A colour change indicated completion of the reaction: agitation was maintained for 30 minutes. The product was washed with 1% acetic acid solution, followed by water washing to remove catalyst and soap, then dried. Completion of interesterification was checked by GLC of the triglycerides.

The product was given a slight selective hardening over sulphur-poisoned nickel catalyst to a slip melting-point of 25.5° C. Postrefining was carried out by bleaching with 2% C300 bleaching earth at 110° C. under $N_2$ for 30 minutes. 1% kieselguhr was added to the cooled product and the whole filtered. After deodorisation (180° C. under vacuum for 4 hours) and addition of 0.1% lecithin the product interesterified blend was made up into confectionery coating compositions.

Further suitable fats are those comprising or consisting substantially of a selectively or unselectively hardened edible oil or fat. In particular embodiments the hardened edible oil or fat can be, for example (e.g. selectively) hardened butter fat or butter oil (or butterfat stearin), or an (e.g. selectively) hardened edible non-lauric oil.

The term "non-lauric fat or oil" means an edible oil in which the principal fatty acyl content is not lauric acid, and for example in which there is a substantial amount of $C_{16}$ and/or $C_{18}$ unsaturated acyl groups, e.g. oleic, linoleic and/or linolenic acyl groups: the remaining bulk of the acyl groups is largely saturated, (e.g. $C_{16}$ and/or $C_{18}$ acids). Examples of such non-lauric oils are cottonseed oil, peanut oil, soyabean oil, sesame oil, safflower oil and sunflower oil, and particularly rapeseed oil (e.g. low-eurcic rapeseed oil) and soyabean oil, and also palm oil.

Particularly suitable for the purposes of the invention are (e.g. low-erucic) rapeseed oil, groundnut or soyabean oil.

By selective hardening we mean exposure of the fat material to be treated to a catalyst which brings about isomerisation of the ethylenic bonds without substantial hydrogenation: considerable geometrical isomerisation (cis⇌trans) occurs. A suitable known catalyst for the purpose is a poisoned nickel catalyst (a fresh nickel catalyst gives much hydrogenation (unselective hardening) but little of the isomerisation required in selective hardening).

The selective (or unselective) hardening can be carried out to the point at which the fat has a convenient slip melting point, e.g. 27°–34° C., though higher and lower melting points may be usable in some circumstances, e.g. 24°–42° C., 25°–40° C. The hardened oil or fat can form 100% of the fat of the confection, for example, or if desired somewhat less, e.g. 80–90% or 95%, if desired.

It is found that such fat coatings and zones for frozen confections can give good pliability and impermeability to moisture at low temperatures, thus enabling the production of frozen confections including baked or crisp components with desirably long shelf-lives at low temperatures.

The confectionery coating compositions can for example be made up with a fat content of 30–70% by weight, e.g. about 45% fat, 35–45% sugar, and 12–16% cocoa powder (e.g. 10/12% fat content cocoa powder). The presence of other fats besides those specified above is not excluded. Optional further additives include for example milk solids, emulsifiers and flavourants.

EXAMPLE 4

A confectionery coating composition was made up using the following constituents:

| Hardened butterfat | 45% |
| Cocoa powder (10/12) | 16.3% |
| Sugar | 38.7% |
| Flavouring | trace |

The hardened butterfat for the composition had been made as follows:

Butterfat was neutralised with 10% of 0.2 N caustic soda, washed free of soap and bleached with 0.3% Tonsil Standard FF and 0.2% of filter aid at 105° C.

The resulting oil was hardened at 180° C. with 0.23% nickel as GK/s catalyst (sulphur-poisoned nickel), at 3 bar hydrogen pressure for about one hour, until a slip melting point increase of 1° C. had been achieved. (The process may be followed by measurement of refractive index, when the $ND^{65}$ changed by about 0.001 during the course of the reaction).

Post-refining was performed with a 10% 0.1 N caustic soda wash until the product was soap-free, bleaching as in the pretreatment, and finally a deodorisation for five hours at 180° C. 0.1% fresh lecithin was added as antioxidant. The product had slip melting point 33°–34° C.

EXAMPLES 5–7

Example 4 was repeated except for the fat base of the fatty confectionery coating. For the coating composition in each Example, the following edible oils were selectively hardened in a similar way to that described above, and to the following slip melting points:

| Example 5 | groundnut oil | s.m.p. 27° C. |
| Example 6 | soyabean oil | s.m.p. 39° C. |
| Example 7 | low-erucic rapeseed oil | s.m.p. 31° C. |

The resulting hardened oils were incorporated and treated in an otherwise similar way to Example 1, and the resulting confections had good storage life together with satisfactory textural and flavour characteristics on consumption.

Further useful fat compositions include interesterified blends of lauric fat or oil and non-lauric oil.

Many of the useful compositions of the can, by way of example but not limitation, be made by using e.g. 55–85% of the lauric fat or oil, and e.g. 45–15%, of the non-lauric oil. For example, we have found that many such compositions made with 50–75% lauric fat or oil, e.g. palm kernel oil or coconut oil, and 50–25% non-lauric oil, e.g. palm oil, or rapeseed oil, e.g. low-erucic rapeseed oil, can show particular utility as fatty bases for enrobing confectionery coating compositions (or couvertures). These can be based for example on 30–70%, e.g. 30–55%, e.g. about 45% of the fat, together with sweetening and flavouring agents such as sugar and cocoa powder and optionally milk solids, to give a suspension in the fat of such solid agents. It is understood that such additional ingredients may include further and maybe different fat.

When palm oil is used here as the non-lauric oil its preferred proportions before interesterification are in the range 45%–25% by weight, especially 40%–35% by weight.

A particularly desirable fat in this category comprises a randomly interesterified blend of palm kernel oil (50–65%) with palm oil (50%–35%), especially in the proportions 60:40:, the s.m.p. can be e.g. 25°–32° C., e.g. 26°–30° C.

Many further examples of useful compositions according to the invention can have a major proportion, e.g. up to 85%, or below 90%, of the non-lauric fat or oil in the interesterified blend.

A particularly desirable fat in this category comprises a randomly interesterified blend of palm kernel oil (PKO) and rapeseed oil (RSO), especially in or about the proportions PKO 82.5:RSO 17.5 weight: the rapeseed oil is preferably selectively hardened to a slip melting point in a desired range, e.g. about 25°–32° C., such as about 25°–27° C.

When rapeseed oil, e.g. low-erucic rapeseed oil, is used as the non-lauric oil its preferred proportions before interesterification are in the range 50–25–15% by weight, especially about 18% by weight.

Further Examples of suitable fats in this category given for illustration but without limitation are:
(a) an interesterified blend of palm kernel oil and low-erucic rapeseed oil (PKO 60:40 RSO): the rapeseed oil is preferably selectively hardened to a slip melting point in a desired range, e.g. about 27° C.;
(b) an interesterified blend of coconut oil (CNO) and rapeseed oil (CNO 82.5:17.5 RSO): the rapeseed oil is preferably selectively hardened to a slip melting point in a desired range, e.g. about 26° C.

EXAMPLE 8

Blends of 60% PKO with 40% palm oil were made from neutralised, fully refined dried oils. 2–2.5 kg batches of the blends were interesterified in a batch process, in a flask fitted with a vigorous stirrer, nitrogen inlet, and temperature control probe. The blends were heated to 110° C. under $N_2$, stirred vigorously and sodium methoxide catalyst (0.2% on the oil) added into the vortex. Stirring was maintained for 30 minutes.

The product was washed with 1% acetic acid solution, followed by water, to remove catalyst and soap, and thoroughly dried. Completion of interesterification was checked by triglyceride GLC analysis.

The dried, interesterified oils were bleached with 2% bleaching earth at 110° C. under nitrogen for 30 minutes. 1% kieselguhr was added to the cooled blends, which were filtered.

650 g batches of the interesterified blends were deodorised for 4 hours at 180° C. under vacuum, and 0.1% of lecithin was added to each deodorised batch, as antioxidant.

Batches of this interesterified blend had slip melting points of 29.5°–31° C.

The maximum rate (%/minute) of solids formation under the standard test conditions in the batches was 16–23%/minute, with 4–5 minutes required on cooling to reach 50% solid. They had periodate values less than 4, usually 0.5 or less, iodine values of about 31–32, and hydroxyl values about 8–10. The refined oils used in their preparation had FFA contents less than about 0.5 and soap values less than about 0.01.

The percentages solids present at various temperatures were as follows:
 −20° C.: 79–85%;
 −10° C.: 77–82%;
 0° C.: 67–72%;
 10° C.: 48–48%;
 20° C.: 16–36%;
 25° C.: 5–20%;
 30° C.: 0–5%;
 35° C.: 0%.

EXAMPLES 9 AND 10

Preparation of fat compositions

Crude low-erucic rapeseed oil was neutralised with 0.8 N NaOH. After a water wash, the oil was boiled with 1.5% its weight of 6 N soda ash and 1% by weight of a sodium silicate solution for 30 minutes at 105° C., then washed free of soap and dried. Bleaching was carried out with 1% Tonsil Standard FF (Trade Mark) bleaching compound 20 minutes at 105° C. under vacuum. The neutralised bleached oil was deodorised 30 minutes at 180° C.

The rapeseed oil so treated was blended with fully-refined palm kernel oil in the weight ratio 40 rapeseed oil to 60 palm kernel oil in a first case (Example 2) and 50 to 50 in a second case (Example 3). Batches of the blends were interesterified continuously with 0.05% by weight sodium catalyst at 125° C. for 4 minutes. The product oil was then added to a vessel partly filled with diluted phosphoric acid (to neutralise excess sodium). The treated product oil (interesterified blends) were washed with 0.2 N NaOH and water; when free of soap the blends were dried and filtered over 0.2% Hyflow (Trade Mark) filter aid.

Batches of the blends were selectively hardened under agitation in an autoclave fitted with six-blade turbine stirrer and four baffles. Hydrogen was blown into the headspace of the autoclave. Hardening was carried out at 180° C. with 0.5% by weight of sulphur-poisoned nickel catalyst at 3–5 kg/cm$^2$ H$_2$ pressure. The blends were hardened to slip melting-points of 26.8° C. (Example 2) and 26.7° C. (Example 3). The selectively hardened interesterified blends were neutralised, freed of soap, dried, bleached and deodorised in a similar manner as before. At 60° C., 0.1% fresh lecithin was added to each as antioxidant.

EXAMPLE 11

(i) Further interesterified blends of palm kernel oil (PKO) and palm oil (PO) according to the invention were prepared as follows.

A crude blend (60 PKO:40 PO) was made up in a vacuum bleacher, vacuum dried, neutralised with 6 N soda ash, washed and dried. The dired product was bleached at 95°–100° C. for 30 minutes with 1% C300 bleaching earth, filtered and transferred to a clean vessel. There followed interesterification with 0.3–0.4% sodium methoxide catalyst, and the treated blend was washed, vacuum dried, and post-refined with 1% AA bleaching earth at 95°–100° C. for 30 minutes. After filtration and deodorisation 0.1% lecithin was added.

(ii) The interesterified blends produced in Example 4(i) were used to make up confectionery coating compositions.

The compositions (Examples 4(A), 4(B), 4(C), and 4(D)) were of the following constituents:

|  | 4A | 4B | 4C | 4D |
|---|---|---|---|---|
| Cocoa solids (non-fat) | 14.2% | 16.3% | 5.1% | 5.1% |
| Milk solids (non-fat) | — | — | 18.8% | 18.8% |
| Sugar | 39.9% | 39.0% | 30.6% | 30.6% |
| Lecithin | 0.5% | 0.5% | 0.5% | 0.5% |
| Cocoa butter | 1.8% | 13.2% | 0.7% | 6.5% |
| Butterfat | — | — | 3.5% | 3.9% |
| Interesterified fat blend of Example 4(i) | 43.6% | 31.0% | 40.8% | 34.6% |
| (Total fat content) | (45.4%) | (44.2%) | (45.0%) | (45.0%) |

EXAMPLE 12

(i) Crude palm kernel oil (FFA=5.1%) and rapeseed oil (FFA=3.2%, erucic acid content 37.2) were neutralised separately with 4 N NaOH, and 4 times as much water. The rapeseed oil was further boiled with soda ash and silicate. The oils were washed free of soap and dried. A blend of the refined oils in the proportions palm kernel oil 82.5% and rapeseed oil 17.5% was bleached with 1% Tonsil Standard FF bleaching compound 20 minutes at 105° C. under vacuum. The blend was filtered at 80° C. The filtered bleached product was interesterified continuously with 0.05% by weight sodium methoxide catalyst at 125° C. for 4 minutes and transferred to a neutraliser vessel partly filled with dilute phosphoric acid. After washing 0.2 N NaOH and water, and after drying, the product was filtered with a commercial filter aid. Two batches of the blend were selectively hardened at 180° C., 3 kg/cm$^2$ H$_2$ pressure, and under strong agitation, with sulphur poisoned nickel catalyst at 0.2% (Example 5(i)A) and 0.5% (Example 5(i)B) respectively. The respective slip melting points achieved after 120 and 150 minutes respective hardening times were 26.8° C. (Example(i)(A) and 26.6° C. (Example 5(i)B). The hardened blends were neutralised, washed free of soap and dried; then they were bleached, filtered, and deodorised (200° C., 4 hours). After cooling to 60° C., 0.1% by weight fresh lecithin antioxidant was added.

(ii) Confectionery coatings were produced from each fat, using the following ingredients:

|  | Coating | | |
|---|---|---|---|
|  | A | B | C |
| Sugar | 25.6% | 20.8% | 15.4% |
| Cocoa powder (12/12% fat) | 12.9% | — | — |
| Cocoa powder (20/22% fat) | — | 10.6% | 7.8% |
| Skim milk powder | 1.7% | — | — |
| Fat Ex. 2(i)A | — | 68.3% | 76.5% |
| Fat Ex. 2(i)B | 59.3% | — | — |
| Emulsifier | 0.5% | 0.3% | 0.3% |
| (Total fat) | (60.7%) | (70.5%) | (78.1%) |

The invention is not limited to the use of the materials particularly mentioned above. Further particular examples of useful interesterified fat compositions, e.g. for coatings intended to be sprayed, contain 15–45% of the lauric fat or oil, e.g. interesterified blends of palm kernel oil and cottonseed oil (15%:85%) selectively hardened to slip melting point 25°–29° C.; of palm kernel oil and low-erucic rapeseed oil (15%:85%), selectively hardened to slip melting point 25°–29° C.

I claim:

1. A process for producing a composite edible product containing a dry edible material selected from the group consisting of biscuits and wafers and a water-containing edible confection selected from the group consisting of ice or ice cream which comprise the steps of:
   (a) spraying a relatively water-impermeable fat-containing edible material which when measured at 46° C. has a viscosity of $\eta_3$ at least 10 poise, $\eta_{100}$ at least 2.0 poise, and $\eta_{CA}$ at least 1.2 poise, from an atomizing spray gun onto a dry edible material selected from the group consisting of biscuits and wafers, and
   (b) combining the water-containing edible confection with the sprayed dry edible material.

2. A process according to claim 1, wherein the spray of relatively water-impermeable fat-containing edible material is applied to the dry edible material at a temperature of about 43°–46° C.

3. A process according to claim 1 or 2, wherein the spray of relatively water-impermeable fat-containing edible material is applied from an atomizing spray gun which delivers a spray within the volume of an inverted cone downwardly on to the dry edible material.

4. A process according to claim 1 or 2 wherein the spray of relatively water-impermeable fat-containing edible material is applied to form a congealed fatty layer of about 0.2–0.8 mm thickness.

5. A process according to claim 1, wherein the fat-containing edible material sprayed on to the dry edible material comprises a couverture composition essentially consisting of a suspension of flavouring and sweetening solids in a fatty base including a fat composition having:
  (a) solids content index (SCI) values (%) in each of the following ranges:
    70–93 at −20° C.;
    65–93 at −10° C.;
    55–90 at 0° C.;
    15–40 at 20° C.;
    0–12 at 30° C.;
    0 at 40° C.;
  (b) a slip melting point in the range 25°–45° C.;
  (c) a viscosity measured at 40° C. of $\eta_{100}$ at least 35 centipoise, and $\eta_{CA}$ at least 30 centipoise; and
  (d) a coating pliability parameter of at least 3.

6. A process according to claim 5, wherein the fat base comprises a fat composition essentially consisting of triglycerides in which less than $\frac{2}{3}$ by number of the acyl groups are short-chain (C≦6) acyl groups and more than $\frac{1}{3}$ by number of the acyl groups are long chain (C≧12) acyl groups, substantially randomly distributed amongst the triglycerides.

7. A process according to claim 6, wherein the fat composition is selected from the group consisting of blends of 25%–75% lauric fat, non-lauric fat or oil with 75%–25% short-chain diacylated long chain monoglyceride, interesterified blends of lauric or non-lauric fat or oil with up to about 10% short-chain triglyceride.

8. A process according to claim 1, wherein the fat-containing edible material sprayed on to the dry edible material comprises a couverture composition essentially consisting of a suspension of flavouring and sweetening solids in a fat base including a fat composition selected, from the group consisting of hardened butter fat, hardened low-erucic rapeseed oil, hardened groundnut oil and hardened soyabean oil, each having a slip melting point in the range about 27°–34° C.

9. A process according to claim 1 wherein $\eta_{100}$ is 2.0 to 3.6 poise.

10. A process according to claim 1 wherein $\eta_{CA}$ is 1.4 to 3.4 poise.

11. A process according to claim 5 wherein the solids content index values are 75–90 at −20° C.; 75–85 at −10° C. and 65–75 at 0° C., the slip melting point is in the range of 25°–36° C.; the viscosity is $\eta_{100}$ at least 40 centipoise measured at 40° C. and $\eta_{CA}$ is at least 33 centipoise.

12. A process for producing a composite edible product containing a dry edible material selected from the group consisting of biscuits and wafers and a water-containing edible confection selected from the group consisting of ice or ice cream which comprises the steps of:
  (a) spraying a relatively water-impermeable fat-containing edible material which when measured at 46° C. has a viscosity of $\eta_3$ at least 10 poise, $\eta_{100}$ at least 2.0 poise, and $\eta_{CA}$ at least 1.2 poise, from an atomizing spray gun on to a dry edible material from the group consisting of biscuits and wafers,
  (b) cooling the resulting product by applying a cooling fluid stream to at least initiate solidification of the water-impermeable fat-containing material, and
  (c) combining the water-containing edible confection with the sprayed dry edible material.

13. A process according to claim 12, wherein the cooling fluid stream is a stream of cold air of liquid nitrogen, applied to the composite for about 0.1–5 seconds.

14. A process according to claim 12 or 13, wherein the fat-containing edible material has a viscosity at 43° C. and 100 sec$^{-1}$ in the range about 180–240 centipoise.

* * * * *

UNITED STATES PATENT AND TRADEMARK OFFICE
CERTIFICATE OF CORRECTION

PATENT NO. : 4,394,392

DATED : July 19, 1983

INVENTOR(S) : David Tresser

It is certified that error appears in the above-identified patent and that said Letters Patent is hereby corrected as shown below:

Col. 3, line 3, "desirable" should be --desirably--;

Col. 5, line 18, "by produced" should be --be produced--;

Col. 6, line 51, "40-70:60-25" should be --40-75:60-25--;

Col. 7, line 25, "water" should be --wafer--;

Col. 10, line 9, "oloic" should be --oleic--;

Col. 11, line 31, before "can" insert --invention--;

Col. 12, line 51, "48-48%" should be --48-58%--;

Col. 13, line 32, "dired" should be --dried--;

UNITED STATES PATENT AND TRADEMARK OFFICE
CERTIFICATE OF CORRECTION

PATENT NO. : 4,394,392

DATED : July 19, 1983

INVENTOR(S) : David Tresser

It is certified that error appears in the above-identified patent and that said Letters Patent is hereby corrected as shown below:

Col. 14, line 11, "(i) (A)" should be --5(i) (A)--;

Col. 14, line 48, "comprise" should be --comprises--;

Col. 16, line 10, "0°C.," should be --0°C.;--;

Col. 16, line 32, after "air" insert --or--.

Signed and Sealed this

Seventeenth Day of January 1984

[SEAL]

Attest:

GERALD J. MOSSINGHOFF

Attesting Officer

Commissioner of Patents and Trademarks